United States Patent [19]
Berger et al.

[11] Patent Number: 6,043,464
[45] Date of Patent: Mar. 28, 2000

[54] ENVIRONMENTAL CONTROL APPARATUS

[75] Inventors: Craig Berger, 8 Meadow Rd., Stockbridge, Mass. 01262; Jerry Wootton, Northfield, Conn.

[73] Assignee: Craig Berger, Stockbridge, Mass.

[21] Appl. No.: 09/076,541

[22] Filed: May 12, 1998

[51] Int. Cl.[7] .............................. B01F 3/02; G05D 21/00
[52] U.S. Cl. .................. 219/494; 165/80.3; 219/538; 236/44 C
[58] Field of Search .............................. 236/44 C, 44 E; 165/80.3, 222; 454/184; 219/494, 538

[56] References Cited

U.S. PATENT DOCUMENTS

| | | | |
|---|---|---|---|
| 1,856,124 | 5/1932 | Austin . | |
| 2,261,852 | 11/1941 | Mathis | 236/44 C |
| 2,974,870 | 3/1961 | Pitts | 236/44 C |
| 2,991,346 | 7/1961 | Bahus, Jr. | 219/19 |
| 3,300,593 | 1/1967 | Luberts | 191/27 |
| 4,017,715 | 4/1977 | Whitney et al. | 219/553 |
| 4,211,542 | 7/1980 | Kramer | 55/179 |
| 4,659,009 | 4/1987 | Newell | 236/44 C |
| 4,687,163 | 8/1987 | Ringer | 246/428 |
| 4,849,611 | 7/1989 | Whitney et al. | 219/538 |
| 5,004,190 | 4/1991 | Montierth et al. | 246/428 |
| 5,197,595 | 3/1993 | Coultas | 206/0.6 |
| 5,204,509 | 4/1993 | Etters et al. | 219/201 |
| 5,632,919 | 5/1997 | MacCracken et al. | 219/494 |

*Primary Examiner*—William Wayner
*Attorney, Agent, or Firm*—Schweitzer Cornman Gross & Bondell LLP

[57] ABSTRACT

An environmental control apparatus controls humidity and temperature in a closed environment such as may exist in outdoor electrical switchgear boxes and the like. Temperature and humidity sensors are coupled to a controller which compares the sensed conditions to low temperatures and a high humidity setpoint. If either the temperature is below the temperature setpoint or the humidity is above the humidity setpoint a heater is energized until the respective condition is corrected. A high temperature cutout is provided to prevent high humidity conditions from causing the heater to raise the temperature to excessive levels. Typically, the controller engages the heater at temperatures of below 40° F., humidity levels of above 65° b, with a high temperature cutout at 140° F.

19 Claims, 2 Drawing Sheets

ENVIRONMENTAL CONTROL APPARATUS

The present invention is directed to a new and improved apparatus for controlling temperature and humidity in an environmental space which may be defined, for example, by the interior of an enclosure.

BACKGROUND OF THE INVENTION

It is well known and established that performance characteristics associated with electronic, electromechanical and mechanical devices may be affected by both temperature and humidity. Low temperatures affect the operation of electrical and electronic components. Switches, printed circuit boards and the like become brittle at low temperatures, while the functional characteristics of components and the circuits are affected by temperature. While temperature compensation techniques are known, many systems do not lend themselves to the economical incorporation of such compensation. Other systems are simply not of the type in which temperature compensation can be easily accommodated.

On the mechanical side, temperature variation, and particularly low temperatures, often impair the efficiency of lubricants, as well as the elasticity of mounts and springs; the physical contraction of components associated with decreasing temperature may also lead to operational variability or inoperativeness. Once again, while techniques may exist for compensating for such temperature effects, such compensation is not always appropriate or economical.

Humidity is also a factor which can deleteriously affect operation, particularly when associated with temperature fluctuations. The combination of falling temperature in a high humidity environment can result in condensation upon environmental surfaces, such as switch contacts, linkages and other operating elements, can lead to corrosion. In addition, the presence of moisture on electronic components, leads and contacts can lead to shorting and changes from the intended values of circuit components.

The foregoing problems are especially acute in connection with switchgear and other apparatus which are typically housed in non-insulated enclosures, located outdoors, which primarily provide only a physical barrier about the equipment for safety and protection purposes.

It is accordingly a purpose of the present invention to provide an environmental control apparatus particularly adapted to allow control and modification of environmental characteristics within an environmental space, such as may be defined by the interior of an enclosure.

A further purpose of the present invention is to provide such an apparatus which allows control of both temperature and humidity conditions.

Still a further purpose of the present invention is to provide such an apparatus which may be programmed and adjusted to maintain temperature and humidity levels within an environmental volume within preset limits which can be optimized for the equipment located within the environment.

Yet a further purpose of the present invention is to provide an apparatus of the aforementioned type which is of compact and economical construction, and which does not constitute a safety or fire hazard.

BRIEF DESCRIPTION OF THE INVENTION

In accordance with the foregoing and other objects and purposes, an environmental control apparatus of the present invention comprises a substantially closed enclosure intended to house equipment intended to be protected from low temperature and high humidity effects. A control system having both temperature and humidity sensors having proportional outputs which are coupled to a controller is located within the enclosure. The controller supervises the operation of a heating element within the enclosure. The controller is configured such that the heating element is activated when the temperature sensed by the temperature sensor is below a trigger temperature or the humidity sensed by the humidity sensor is above a particular humidity. The controller disables the heater when the temperature rises to a first preset value and the humidity drops to a preset value.

Because humidity control may be required over a temperature range different from that subject to thermostat control, the controller allows the elements to drive the heater independently. The controller may also include a supervisory function which prevents operation of the heater in the event ambient temperature rises above a preset limit, irrespective of the humidity level.

BRIEF DESCRIPTION OF THE DRAWINGS

A fuller understanding of the present invention and the features and operation thereof, will become apparent upon consideration of the following detailed description of a preferred, but nonetheless illustrative embodiment of the invention, when reviewed in conjunction with the annexed drawings, wherein.

DETAILED DESCRIPTION OF THE INVENTION

Figure 1:
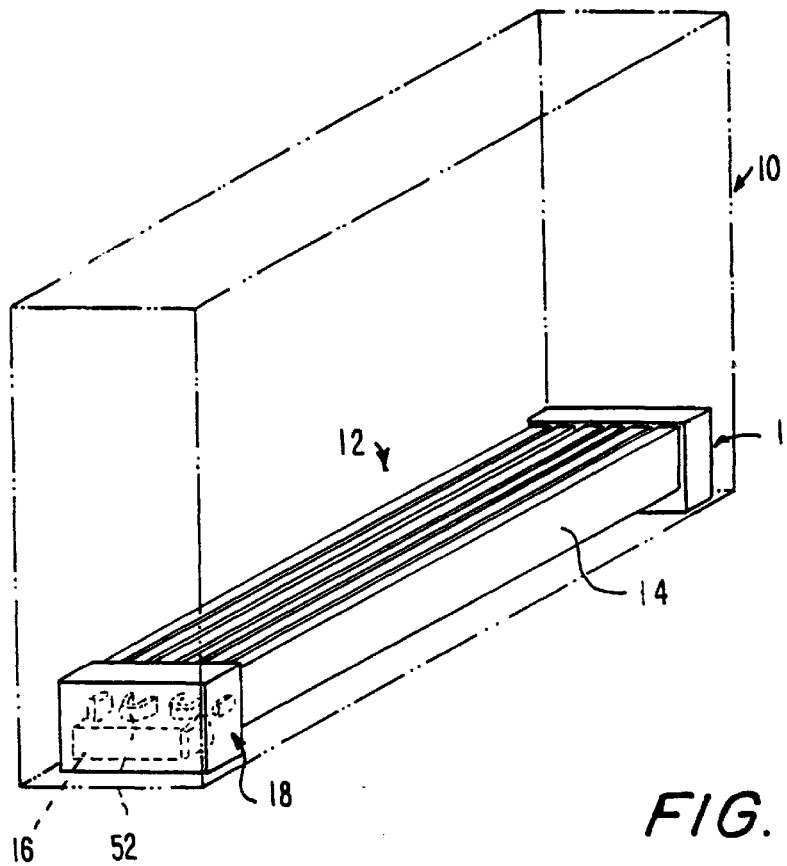
FIG. 1 is a perspective view showing a typical enclosure in phantom with the components of the present invention located therein.

Referring initially to FIG. 1, enclosure 10, depicted in phantom, may be of a generally conventional type utilized to house electrical switchgear or other electronic or electromechanical components. Typically, such an enclosure is freestanding, exposed to the elements. The enclosure may be formed of steel, aluminum or other durable material, providing a weatherproof housing for the devices enclosed thereby. In addition to the components housed therein (not shown), the active environmental control apparatus portion 12 of the present invention is also located within the enclosure. The apparatus generally includes a heater unit 14 coupled to an integral controller 16, located in a heater unit endcap 18. Control unit 16 includes temperature and humidity sensors as well as processing circuitry coupled to the sensors for generating a control or activation signal for the heater unit 14. The system 12 typically receives its power from the AC mains, which are usually available within the enclosure in conjunction with the apparatus located therein, through a terminal block 20 seen in FIG. 2. It is to be appreciated, however, that power can alternatively be obtained from any source of alternating or direct current, through appropriate power converters as known in the art configured to provide the necessary voltage levels.

Figure 3:
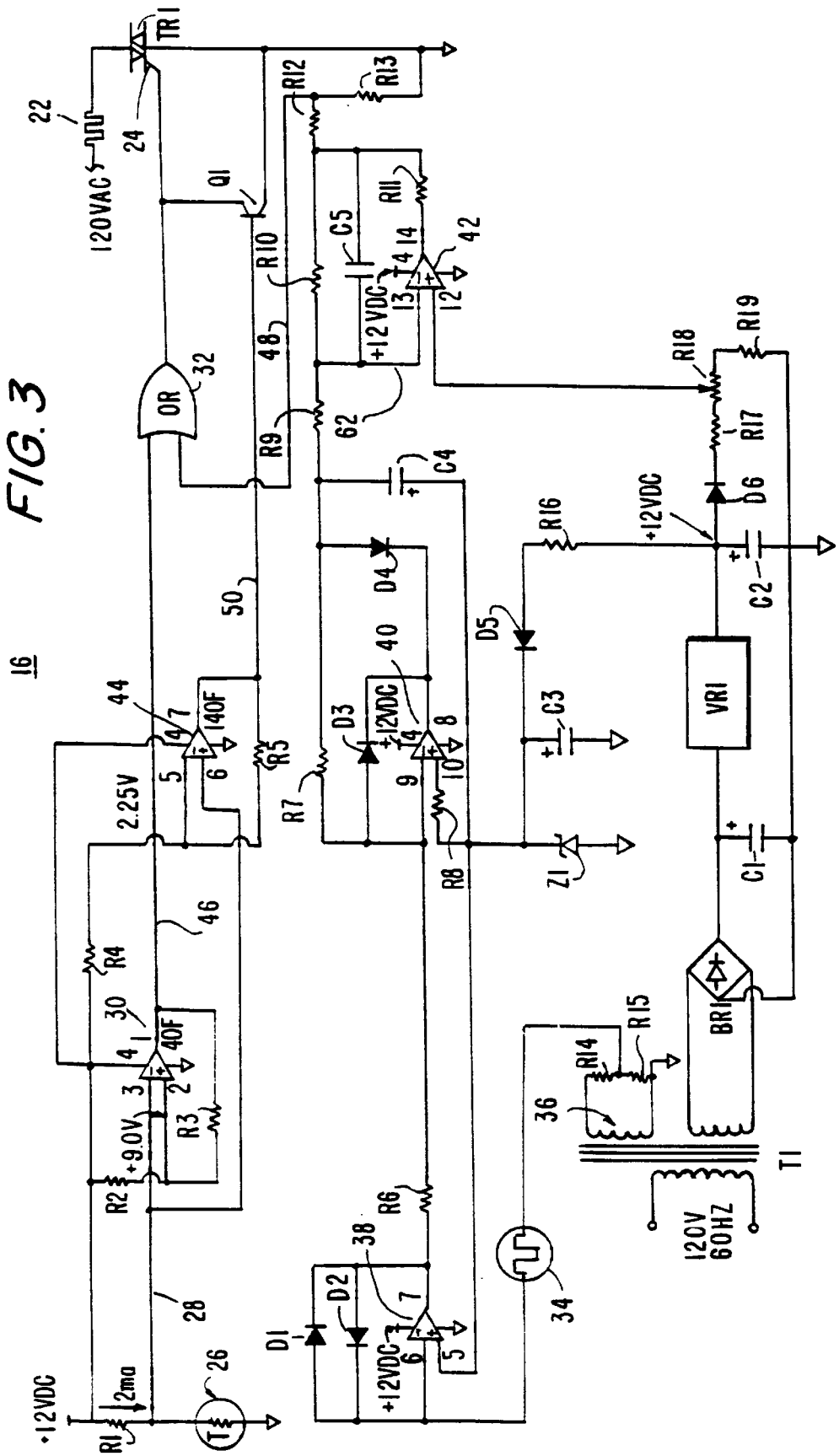
FIG. 3 is a schematic drawing of the circuitry of the present invention.

With reference to FIG. 3, the environmental control apparatus of the present invention is preferably configured to operate from conventional 120 volt alternating current through transformer T1, which in conjunction with rectifier bridge BR1, capacitors C1 and C2, and voltage regulator VR1 provide a stable 12-volt direct current for control system operation. Other required voltages are also made available by the transformer. Drive voltage for the heater element 22 of heater unit 14 is taken directly from the mains. Heater element 22 is in series with a switching element in the form of triac TR1 which, when switched on by the application of an appropriate potential to its trigger 24, allows bi-directional conduction between its main terminals. So switched, mains power is applied to the heater element.

Triac TR1, and thus heater element 22, are energized as a result of an appropriate temperature and/or humidity-derived control signal being generated by an appropriate electrical sensor and processed by the controller of the invention. Temperature sensor 26, which may be a thermistor or other temperature responsive resistive element, is in series with resistor R1, forming a voltage divider network between the 12-volt positive source and system ground. Typically, the temperature sensor has a negative temperature coefficient. Thus, the voltage on line 28, which is directly proportional to the resistance of thermistor 26, and which decreases as the sensed temperature increases, is applied to comparator 30.

As known in the art, comparator 30, which may be formed from an operational amplifier, is configured to switch its output into the "on" state when the voltage on line 28, applied to the comparator's non-inverting input, equals or exceeds the reference voltage applied to its other, inverting input. The reference voltage is established by the combination of resistors R2 and R3 forming a voltage divider network. R3 is also a feedback element, slowing the response of the comparator to prevent oscillation about the comparator's switching point. These resistors are chosen to provide a reference voltage to the comparator which corresponds to the voltage on line 28 associated with a first reference temperature, such as 40°, which is the temperature at which the heater element 22 is to be de-energized. The heater element 22 is to be energized at sensed temperatures below the first reference temperature. At temperatures below the first reference temperature the voltage on line 28 is above that set by the voltage divider system of R2 and R3, as thermistor 26 is of high resistance. The output of the comparator is thus enabled and is passed to or gate 32 by line 46, which will be discussed infra, which gate in turn applies a trigger voltage to triac TR1's trigger terminal 24. As the temperature rises the resistance of thermistor 26 decreases, causing the voltage on line 28 to drop. When the voltage drops below the reference, the comparator's output goes low.

In a similar manner, humidity sensor 34 also controls the triggering of to triac TR1. Because humidity sensor 34 has a complex impedance which varies as a function of humidity, and is not a pure resistive load, it is preferably driven by alternating, rather than direct, current. Accordingly, transformer T1 includes secondary winding 36 which drives humidity sensor 34 through load resistors R14 and R15. The voltage applied to operational amplifier 38 is a function of the impedance of sensor 34 which in turn is a function of the humidity sensed thereby. Operational amplifier 38 is configured as a logarithmic compression amplifier by virtue of feedback diodes D1 and D2, and serves to compensate for the non-linear impedance characteristics of humidity sensor 34.

The output of amplifier 38 is fed through resistor R6 to operational amplifier 40, which serves as an active alternating current to direct current converter or rectifier in conjunction with the action of diodes D3 and D4, capacitor C4, and feedback resistor R7. The output of operational amplifier 40 is fed through resistor R9 to operational amplifier 42, configured as a comparator, which compares the developed d.c. voltage level corresponding to the sensed humidity applied to its inverting input on line 62 to a reference voltage applied to its non-inverting input. The reference voltage is developed by the voltage divider action of potentiometer R18 which, in series with resistors R17 and R19, forms a resistive network between the 12 volt potential established by voltage regulator VR1 and ground, and equals the voltage on line 62 corresponding to the humidity level at which the heater is to be energized, such as 65%. Inclusion of the potentiometer allows the humidity level setpoint to be adjusted, and further allows adjustment of the circuit to accommodate unit to unit variations in the sensor.

Resistors R10 and R11 and capacitor C5 form a feedback network to stabilize the comparator, while the comparator's output is coupled by resistor R12 to an input of or gate 32. Zener diode Z1 provides a stable 5 volt reference voltage for operation of operational amplifiers 38 and 40, while diode D6 provides temperature compensation for the processing of the humidity-based signal, as humidity sensor 34's impedance has a temperature responsive component.

The impedance of humidity sensor 34 decreases as humidity rises. Because the sensor is coupled to the inverting inputs of amplifiers 38 and 40, the direct current voltage generated by the a.c. to d.c. converter and applied to comparator 42 decreases as the humidity increases. Thus at low humidity levels the voltage applied to the inverting input is above the chosen humidity setpoint reference voltage, and the comparator remains off, with no output voltage. When the humidity rises to or above the level at which the corresponding generated d.c. voltage decreases to or below the level of the setpoint reference voltage, the comparator switches on, generating an output voltage which is passed through resistor R12 to the or gate through line 48.

Or gate 32 generates a positive output voltage on its output terminal coupled to triac trigger 24 when at least one of its inputs is high. Thus, the existence of either a temperature below the first reference temperature, which places a positive voltage to a first input of the or gate, or a humidity of above the chosen reference humidity, which places a positive voltage on a second input of the or gate, turns the gate on, which in turn provides a positive voltage to triac trigger 24.

As known, triac TR1, when used to control an alternating current voltage applied across its main terminals, remains energized for so long as a proper trigger voltage is applied to its trigger 24, as each zero crossing of the a.c. signal resets the triac. Thus, the triac conducts, and allows current to pass to heater element 22, so long as or gate 32 is on as a result of at least one of its inputs being energized.

The present invention also provides a high temperature limit to prevent activation of the heater 14 when environmental conditions within the enclosure are such that further heating might result in deleterious effects. For example, a high humidity condition, potentially activating heater element 22, can occur at high ambient temperatures. Activation of the heater in response to such a high humidity situation could raise the temperature of the enclosure to unwanted levels. The present invention thus includes a second temperature responsive control circuit which prevents the heater from being energized, and overheating the enclosure contents, when the sensed temperature exceeds a second, high-value setpoint. Thus, even in a continuing high-humidity environment, the enclosure's contents will not be placed under excessive temperature stress as a result of heater operation.

Accordingly, and with continued reference to FIG. 3, the voltage generated on line 28 by thermistor 26 is also fed to operational amplifier-based comparator 44, which is configured to switch into an "on" state when its non-inverting input voltage from line 28 exceeds the resistance of temperature sensor 26, exceeds the reference voltage applied to its inverting input through the voltage divider action of R4 and feedback resistor R5. The output of comparator 44 on line 50, which may correspond to a sensed temperature of 140° F. or greater, provides a high temperature cutout signal.

Line 50 is coupled to the base of transistor Q1, which has its emitter-collector junction between triac TR1's trigger and ground side main terminal. With no voltage applied to its base, the transistor is off, and no current flow can occur in its emitter-collector path. Thus, the output of or gate 32 is coupled to triac trigger 24. With the turn-on of comparator 44, however, its output voltage is applied to the transistor s base, turning the transistor on, and providing a current path though its emitter-base loop. This path shorts the output of or gate 32 to ground, bypassing the triac trigger, placing the trigger at ground, and preventing the triac from conducting. Thus, the existence of a high-temperature condition forces the triac into an off condition, preventing the heater element from being activated even in the presence of a high humidity control voltage applied to or gate 32. And while a low temperature control signal generated by comparator 30 would not be present at the time a high temperature signal is generated under normal operating conditions, the operation of the high temperature cutout and transistor Q1 also prevents a system malfunction associated with comparator 30 from forcing triac TR1 into an improper on state at elevated enclosure temperatures.

Heater unit 14 may be of conventional design, having a heat output characteristic sized for compatibility with the enclosure into which it is to be installed. In a preferred embodiment, however, it is of a construction which utilizes as a heater element a tape-like resistive heating element, such as manufactured by Raychem Corporation of Menlo Park, Calif. The heat tapes preferably incorporate a positive temperature coefficient construction, their impedance increasing as temperature increases. Such a feature maximizes heat output at lower temperatures and lessens overshoot at the higher shutoff temperatures.

Figure 2:
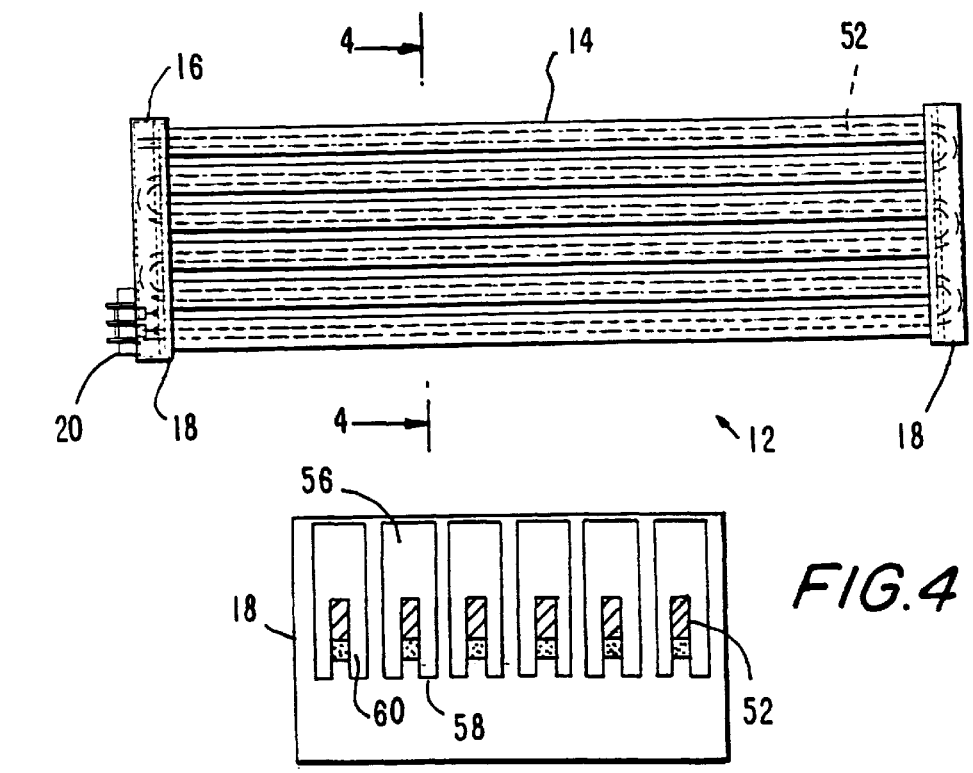
FIG. 2 is a top plan view of the heater of the present invention.
Figure 4:
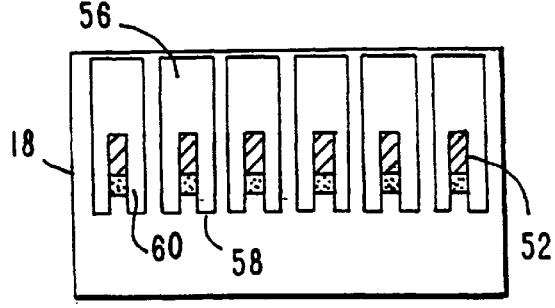
FIG. 4 is an elevation view in section taken along line 4—4 in FIG. 2.

As depicted in FIGS. 1, 2 and 4, the heat tape 52 may be led in a serpentine fashion in vertical slots 54 in the lower faces 58 of a series of parallel heat conductive heater cores or radiator blocks 56 which may be fashioned, for example, of aluminum, either cast, machined or assembled from individual parts. Potting compound 60 surrounds, protects and covers the tape in the slots, and insures thermal coupling between the tape and the radiating cores. The endcaps 18 support the cores in a spaced arrangement above the bottom of the enclosure. Their spaced positioning above the enclosure floor with a free space below the cores, permit rising convection currents to be generated to efficiently warm the enclosure volume.

The components for control unit 16 depicted in FIG. 3 may be mounted on and interconnected by a printed circuit board in a conventional manner. The circuit board is similarly mounted in a known manner within an endcap, an end of the heat tape 52 being provided to allow interconnection with the conductors thereof. Temperature and humidity sensors 26 and 34 may be mounted directly to the board, or may be mounted on short leads to allow them to be positioned in other locations to improve response characteristics.

With the apparatus installed in an enclosure and connected to an appropriate source of power the apparatus remains in a quiescent state, so long as the temperature in the enclosure is above the first low temperature setpoint and the humidity in the enclosure is below the humidity setpoint. If either the temperature falls below the low level setpoint, or the humidity rises above the setpoint, triac TR1 is triggered, allowing current to pass to heater element 22, raising the temperature in the enclosure and lowering the humidity level. When the temperature and/or humidity returns to an acceptable value the triac is turned off and the heater element is de-energized. The apparatus returns to the quiescent state, subsequently triggering the triac to energize the heater element as required as conditions in the enclosure change. In the event the temperature within the enclosure reaches the second, high temperature setpoint, transistor Q1 is energized, diverting triac trigger signals to ground, preventing the heater element from being energized until the enclosure temperatures falls below the high temperature setpoint.

Illustrative values for various components shown in FIG. 3 are as follows:

| | |
|---|---|
| C1 | .22 mf |
| C2, C3 | .47 mf |
| C4 | .22 mf |
| C5 | .1 mf |
| D1–6 | 1N4007 |
| VR | 12 volt |
| Thermistor | Keystone #RL2006–2753 |
| Humidity Sensor | Ohmic Instruments #UPS 500 |
| Op amps | LM224N |
| Or gate | MC 14071BCP |
| R1 | 4.7K |
| R2, 4, 6 | 10K |
| R3 | 15K |
| R5 | 330K |
| R7 | 20K |
| R8 | 6.8K |
| R9, 10, 13, 17, 19 | 100K |
| R11 | 220K |
| R12, 14, 15 | 47K |
| R16 | 3.3K |
| R18 | 10K variable |
| Q1 | 2N2222A |
| TR1 | 400 v/40 amp |
| Z1 | 5.1 v |

We claim:

1. A environmental control apparatus, comprising:
   a substantially closed enclosure having an interior space defining an environmental space the humidity and temperature of which are to be controlled;
   a temperature sensor for sensing the temperature of the environmental space;
   a humidity sensor for sensing the humidity of the environmental space;
   a heater for heating the environmental space; and
   a controller coupled to said temperature sensor, humidity sensor and heater for operating said heater to maintain the temperature in the environmental space above a lower limit and for maintaining the humidity in the environmental space below an upper limit, said controller including means to deactivate the heater from responding to a sensed humidity above the upper limit when the temperature sensed by the temperature sensor is above a second higher limit.

2. The environmental control apparatus of claim 1 wherein the heater comprises an electrical resistance heating element having a positive temperature coefficient.

3. The environmental control apparatus of claim 2 wherein the heating element comprises a heat tape.

4. The environmental control apparatus of claim 3 wherein said heater tape is mounted to a radiator.

5. The apparatus of claim 4 wherein said radiator comprises a series of conductive blocks arranged in a parallel grid arrangement with convection spaces between the blocks.

6. The apparatus of claim 5 wherein each of said blocks include a slot, the tape being arranged in the slots.

7. The apparatus of claim 6 wherein the slots are on a lower face of the blocks.

8. The apparatus of claim 7 wherein the blocks are supported above a floor of the enclosure.

9. A environmental control apparatus for temperature and humidity control of an interior environmental space within an enclosure, comprising:
   a temperature sensor for sensing the temperature of the environmental space;
   a humidity sensor for sensing the humidity of the environmental space;
   a heater for heating the environmental space; and
   a controller coupled to said temperature sensor, humidity sensor and heater for independently operating said heater in response to a sensed temperature below a lower limit or a sensed humidity above an upper limit, the controller including means to deactivate the heater from responding to a sensed humidity above the upper limit so long as the temperature sensed by the temperature sensor is above a second, higher limit.

10. The environmental control apparatus of claim 9 wherein the heater comprises an electrical resistance heating element having a positive temperature coefficient.

11. The environmental control apparatus of claim 10 wherein the heating element comprises a heat tape.

12. The environmental control apparatus of claim 11 wherein said heater tape is mounted to a radiator.

13. The apparatus of claim 12 wherein said radiator comprises a series of conductive blocks arranged in a parallel grid arrangement mounted in a spaced arrangement above a floor of the enclosure.

14. The apparatus of claim 13 wherein each of said blocks include a slot, the tape being arranged in the slots.

15. The apparatus of claim 14 wherein the slots are on a lower face of the blocks.

16. The apparatus of claim 11 wherein said controller includes means generating an electrical output signal when the sensed temperature is below the lower level; means for generating an electrical output signal when said sensed humidity is above the upper limit; means for coupled to the heater to energize the heater; and gate means coupled to both said means for generating an electrical output signal and said heater energizing means to activate the heater energizing means in the presence of either of said electrical output signals.

17. The apparatus of claim 16 wherein said heater energizing means is a triac.

18. The apparatus of claim 16 wherein said means to deactivate the heater comprises means for generating a third electrical output signal when the sensed temperature is above the second limit and means for shorting the electrical output of said gate to ground in the presence of said third electrical output signal.

19. The apparatus of claim 18 wherein said shorting means comprises a transistor having a collector-emitter junction between a trigger input to the triac and ground.

* * * * *